US011239593B2

United States Patent
Leidner et al.

(10) Patent No.: US 11,239,593 B2
(45) Date of Patent: Feb. 1, 2022

(54) ELECTRICAL CONTACT ELEMENT FOR AN ELECTRICAL CONNECTOR HAVING MICROSTRUCTURED CAVERNS UNDER THE CONTACT SURFACE

(71) Applicants: TE Connectivity Germany GmbH, Bensheim (DE); Steinbeiss-Forschungszentrum, Saarbruecken (DE)

(72) Inventors: Michael Leidner, Lambrecht (DE); Frank Mucklich, Schwalbach (DE); Leander Reinert, Saarwellingen (DE); Herr Kim Eric Trinh Quoc, Saarbrücken (DE); Helge Schmidt, Speyer (DE); Stefan Thoss, Worms (DE)

(73) Assignees: TE Connectivity Germany GmbH, Bensheim (DE); Steinbeiss-Forschungszentrum, Saarbruecken (DE)

( * ) Notice: Subject to any disclaimer, the term of this patent is extended or adjusted under 35 U.S.C. 154(b) by 0 days.

(21) Appl. No.: 16/270,716

(22) Filed: Feb. 8, 2019

(65) Prior Publication Data
US 2019/0173214 A1     Jun. 6, 2019

Related U.S. Application Data

(63) Continuation of application No. PCT/EP2017/070037, filed on Aug. 8, 2017.

(30) Foreign Application Priority Data

Aug. 8, 2016 (DE) .......................... 102016214693.9

(51) Int. Cl.
*B32B 15/01*     (2006.01)
*H01R 13/03*     (2006.01)
(Continued)

(52) U.S. Cl.
CPC ............. *H01R 13/03* (2013.01); *B32B 15/01* (2013.01); *B32B 15/018* (2013.01); *C22C 9/00* (2013.01);
(Continued)

(58) Field of Classification Search
CPC ........ H01R 13/03; H01R 4/26; H01R 13/533; H01R 43/005; H05K 3/4007; C25D 5/024;
(Continued)

(56) References Cited

U.S. PATENT DOCUMENTS 3,648,002 A * 3/1972 Du Rocher ............ G04G 17/06
                                                               200/265
4,328,410 A * 5/1982 Slivinsky ........... B23K 26/0661
                                                               219/121.69
(Continued)

FOREIGN PATENT DOCUMENTS

CN     101652818 A     2/2010
CN     102570125 A     7/2012
(Continued)

OTHER PUBLICATIONS

PCT Notification, Transmittal of the International Search Report and Written Opinion of the International Searching Authority, Intl Appl No. PCT/EP2017/070037, dated Oct. 24, 2017, 15 pages.
(Continued)

*Primary Examiner* — Tho D Ta
(74) *Attorney, Agent, or Firm* — Barley Snyder

(57) ABSTRACT

An electrically conductive contact element for an electrical connector comprises a contact surface having a plurality of caverns arranged under the contact surface in a microstructure and an auxiliary material filled in the plurality of caverns.

21 Claims, 3 Drawing Sheets

(51) Int. Cl.
*H01R 13/533* (2006.01)
*H01R 43/00* (2006.01)
*C22C 9/00* (2006.01)

(52) U.S. Cl.
CPC ......... *H01R 13/533* (2013.01); *H01R 43/005* (2013.01)

(58) Field of Classification Search
CPC ... C25D 5/16; C25D 5/10; H01H 1/06; C23C 28/023; B32B 15/01; B32B 15/018; C22C 9/00
See application file for complete search history.

(56) References Cited

U.S. PATENT DOCUMENTS

| | | | |
|---|---|---|---|
| 7,294,028 | B2 | 11/2007 | Rehbein et al. |
| 8,616,901 | B2 | 12/2013 | Shindo |
| 8,804,970 | B2 | 8/2014 | Grill et al. |
| 9,057,142 | B2 | 6/2015 | Freckmann et al. |
| 9,312,049 | B2 | 4/2016 | Schmidt et al. |
| 9,590,340 | B2 * | 3/2017 | Blumenschein ........ B32B 15/01 |
| 9,924,601 | B2 | 3/2018 | Ostholt et al. |
| 2004/0229077 | A1 * | 11/2004 | Mori .................. H01R 13/03 428/647 |
| 2005/0048308 | A1 * | 3/2005 | Mucklich .................. C22F 3/00 428/614 |
| 2006/0204741 | A1 | 9/2006 | Rehbein et al. |
| 2010/0101831 | A1 * | 4/2010 | Kobayashi ............... C25D 7/00 174/126.2 |
| 2011/0100825 | A1 | 5/2011 | Heinrichsdorff et al. |
| 2012/0138330 | A1 * | 6/2012 | Masago .................. C25D 5/10 174/68.1 |
| 2013/0014979 | A1 * | 1/2013 | Uzoh ..................... H01R 13/03 174/257 |
| 2014/0094072 | A1 | 4/2014 | Seki et al. |
| 2015/0004853 | A1 | 1/2015 | Blumenschein et al. |
| 2015/0280339 | A1 * | 10/2015 | Saka ...................... H01R 13/03 439/886 |
| 2016/0037650 | A1 | 2/2016 | Ostholt et al. |
| 2016/0344127 | A1 * | 11/2016 | Drew .................... C23C 24/04 |
| 2017/0012377 | A1 * | 1/2017 | Ochi ..................... H01R 13/03 |

FOREIGN PATENT DOCUMENTS

| | | |
|---|---|---|
| CN | 102570109 B | 4/2014 |
| CN | 104321937 A | 1/2015 |
| EP | 2528167 A1 | 11/2012 |
| JP | 2000215729 A | 8/2000 |
| JP | 2002343168 A | 11/2002 |
| JP | 2006527305 A | 11/2006 |
| JP | 2011527487 A | 10/2011 |
| JP | 201257212 A | 3/2012 |
| JP | 2013011016 A | 1/2013 |
| JP | 2013501145 A | 1/2013 |
| JP | 2013-37928 A | 2/2013 |
| JP | 2014519157 A | 8/2014 |
| JP | 2015501071 A | 1/2015 |
| JP | 2016507642 A | 3/2016 |
| TW | 201532075 A | 8/2015 |
| WO | 2013087487 A2 | 6/2013 |
| WO | 2013087487 A3 | 6/2013 |

OTHER PUBLICATIONS

Chinese Second Office Action with English translation, Chinese Patent Application No. 201680018824.9, dated Aug. 2, 2019, 11 pages.
Abstract of JP 2013037928 A, dated Feb. 21, 2013, 1 page.
Japanese Notice of Reasons for Refusal, dated Mar. 24, 2020, 11 pages.
Abstract of CN 101652818A, dated Feb. 17, 2010, 1p.
Abstract of CN 102570109B, dated Apr. 16, 2014, 1p.
Abstract of CN 104321937A, dated Jan. 28, 2015,1p.
The First Office Action dated Oct. 16, 2020 from the CNIPA in Appln. No. 201780048826.7, 7 pp.
English translation of the First Office Action dated Oct. 16, 2020 from the CNIPA in Appln No. 201780048826.7, 9 pp.
Taiwanese Office Action dated Jul. 12, 2021, 8 pp.
Second Office Action from the CNIPA dated Jul. 9, 2021 in Appln. No. 201780048826.7, and English translation thereof, 25 pp.
Abstract of TW201532075A, dated Aug. 16, 2015, 1 p.

* cited by examiner

ELECTRICAL CONTACT ELEMENT FOR AN ELECTRICAL CONNECTOR HAVING MICROSTRUCTURED CAVERNS UNDER THE CONTACT SURFACE

CROSS-REFERENCE TO RELATED APPLICATIONS

This application is a continuation of PCT International Application No. PCT/EP2017/070037, filed on Aug. 8, 2017, which claims priority under 35 U.S.C. § 119 to German Patent Application No. 102016214693.9, filed on Aug. 8, 2016.

FIELD OF THE INVENTION

The present invention relates to an electrical contact element for an electrical connector and, more particularly, to an electrical contact element having a contact surface with microstructured caverns under the contact surface.

BACKGROUND

Electrical connectors are plugged together with a mating connector in order to produce an electrical connection. Electrical connectors are generally used either for signal transmission or for power transmission and can be defined as an electromechanical system which provides a separable interface between two electronic subsystems. For this purpose, electrical connectors normally have electrically conductive contact elements which come into contact with a contact element of the mating connector when plugged together. The contact elements of the connector are commonly formed as contact pins and those of the mating connector are commonly formed as contact springs. When the connector and mating connector are plugged-together, the contact springs exert elastic spring forces on the contact pins in order to guarantee a reliable, electrically conductive connection.

In motor vehicles, for example, electrical connectors transmit energy and link electrical and electronic systems. In motor vehicles, connectors are exposed to extreme temperature variations, vibrations, and corrosive media. An increase in the operation temperatures results in greater wear, in particular with the commonly used tin-coated copper based contact elements. The so-called fretting corrosion represents is most serious wearing mechanism in which oscillation wear caused by microvibrations leads to the formation of insulating oxide layers in contact areas and therefore to the malfunction of connectors.

Base contact surfaces with tin, nickel, or alloys thereof are particularly prone to friction corrosion (fretting or scuffing) in the event of small relative movements. Furthermore, in the case of multi-pole connectors, the plugging forces are often beyond those required by users and with noble metal based contact surfaces, the tendency for cold-welding is a known problem.

Along with a high wear resistance, low plugging and pulling forces are required in order to facilitate the mounting and maintenance of connectors. Moreover, a partial abrasion takes place at the contact surface of a contact element while a connector is being plugged together with a mating connector. This wear caused by abrasion limits the number of plug-ins and thus reduces their operating lives.

In order to optimize the plugging force, the surface wear, or the scuffing (fretting), contact surfaces of the connectors in the prior art are oiled or greased or special alloys are employed on the contact surface. The employment of special alloys is costly. Greased or oiled contact surfaces lose the applied grease or oil when in operation and form resins over the course of their lifetime or in the event of repeated plugging processes.

SUMMARY

An electrically conductive contact element for an electrical connector comprises a contact surface having a plurality of caverns arranged under the contact surface in a microstructure and an auxiliary material filled in the plurality of caverns.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
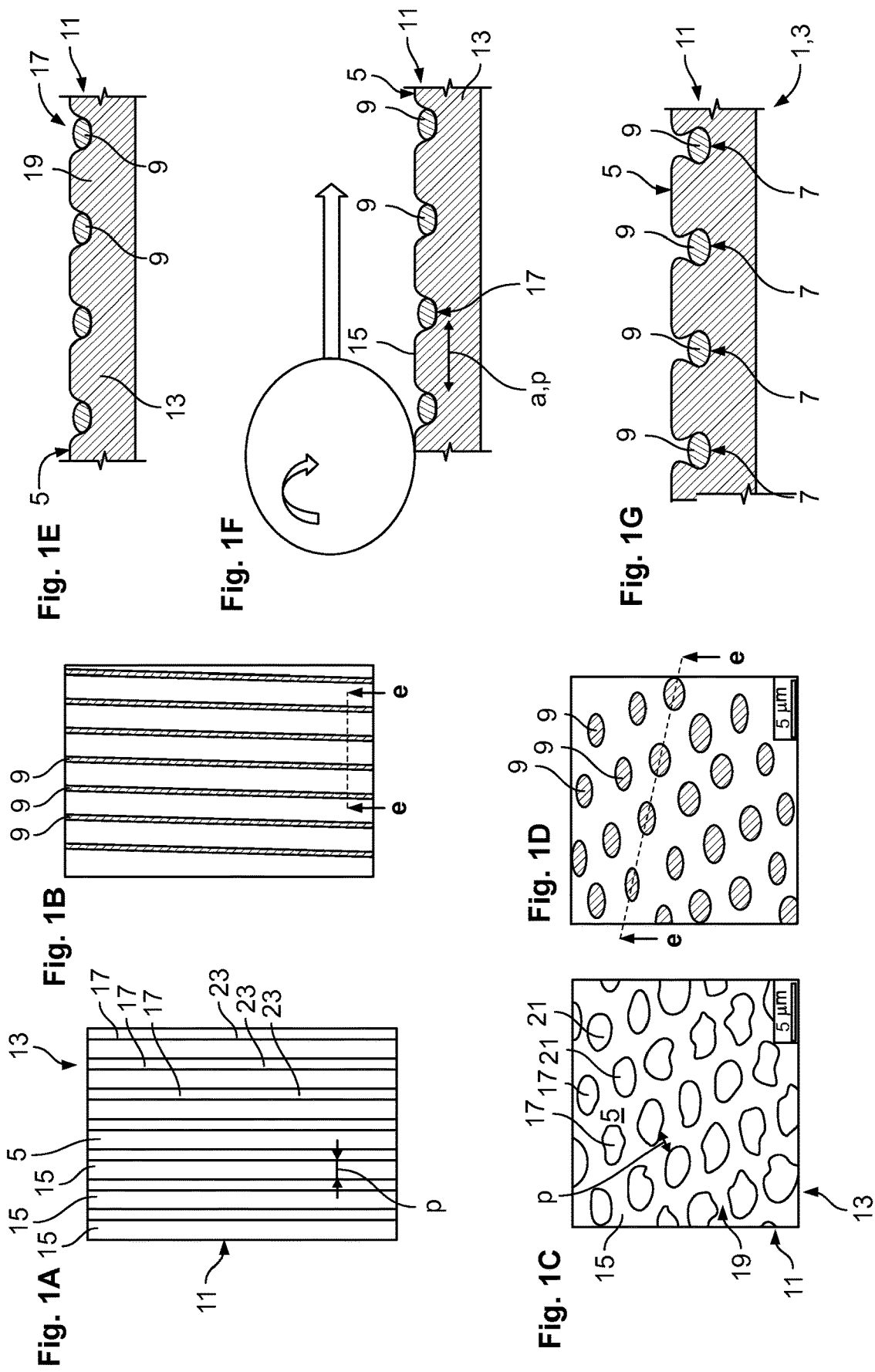
FIG. 1A is a top view of a contact surface having a microstructure.
FIG. 1B is a top view of the contact surface with an auxiliary material filled in the microstructure of FIG. 1A.
FIG. 1C is an enlarged top view of the contact surface having a microstructure according to another embodiment.
FIG. 1D is an enlarged top view of the contact surface with the auxiliary material filled in the microstructure of FIG. 1C.
FIG. 1E is a sectional side view of the microstructure taken along line E-E of FIGS. 1B and 1D.
FIG. 1F is a sectional side view of the microstructure in a step of enclosing the auxiliary material in the microstructure.
FIG. 1G is a sectional side view of a contact element.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the disclosure to those skilled in the art.

An electrically conductive contact element 1 according to an embodiment is produced according to the method shown in FIGS. 1A-1G.

The contact element 1 for an electrical connector 3, as shown in FIG. 1G, has a contact surface 5. Caverns 7 filled with an auxiliary material 9 are located under the contact surface 5. The caverns 7 are arranged under the contact surface 5 in a microstructure 11. In the shown embodiment, the caverns 7 in the microstructure 11 are spaced regularly at a spacing a, shown in FIG. 1F, from one another in the microstructure 11. In an exemplary embodiment, the spacing a is 0.5 to 300 μm. The arrangement of the caverns 7 under the contact surface 5 means that the caverns 7 do not have an output at the contact surface 5 or, at best, an outlet with such tight dimensions that auxiliary material 9 filled into the caverns 7 cannot be accessed without establishing an opening from the contact surfaces 5 into the caverns 7. The spatial dimensions in the caverns 7 is in the range of 0.1-50 µm.

The individual method steps of forming the microstructure 11 at the contact surface 5, applying the auxiliary material 9 onto the contact surface 5, and enclosing the auxiliary material 9 in the microstructure 11 of FIGS. 1A-1G will now be described in greater detail. The starting material of the method is the contact element 1. The contact element 1 is electrically conductive and consists of a base material 13, as shown in FIG. 1A. The base material 13, in various embodiments, can be copper or a copper alloy.

In a first method step shown in FIGS. 1A and 1C, a microstructure 11 is produced at the contact surface 5 of the base material 13. The microstructure 11 consists of, for example, elevations 15 and recesses 17 which periodically alternate with one another. In this way, the recesses 17 form, in the exemplary embodiment of FIG. 1A, trenches 23, and the elevations 15 form walls between the trenches 23. Two adjacent recesses 17 have a spacing a of 0.5 to 300 µm, depending on the production method. In this way, a regular, periodic stripe structure arises as the microstructure 11 with a period length p which corresponds to the spacing a in the microstructure 11. In an embodiment, the microstructure 11 can extend parallel to the contact surface 5. The microstructure 11 can be arranged near the surface 5, for example in a range of up to 1000 µm deep, measured from the contact surface 5.

An alternative microstructure 11 is shown in FIG. 1C. The microstructure 11 in FIG. 1C also has a homogenous pattern 19 with periodic elevations 15 and recesses 17, and the recesses 17 are formed substantially as circular disk-shaped holes 21. In the shown embodiment, two adjacent holes 21 have a spacing a of, for example, 0.5 to 300 µm, which corresponds to that of the period length p. In another embodiment, the period length p is 1 to 100 µm.

The microstructure 11 at the contact surface 5 shown in FIGS. 1A and 1C can be created, for example, with a laser or an electron beam. Very large contact surfaces can be microstructured in a short period of time using a laser or electron beam. However, other surface treatments, for example masking and etching, can be employed to form the microstructure 11.

After the microstructure 11 has been formed at the contact surface 5, the application of the auxiliary material 9 onto the contact surface 5 takes place in a next step shown in FIGS. 1B, 1D and 1E. The auxiliary material 9 is filled into the recesses 17; the trenches 23 or holes 21 of the microstructure 11.

Subsequently, in a further method step shown in FIG. 1F, the auxiliary material 9 is enclosed in the microstructure 11. In the shown embodiment, the surface 5 is mechanically deformed, such as by rolling, to enclose the auxiliary material 9. After such a mechanical deformation, the auxiliary materials 9 are enclosed in the microstructure 11, as the areas of the microstructure 11 with elevations 15 are rolled over the auxiliary material 9 arranged in the recesses 17. The recesses 17 are thereby sealed and caverns 7 filled with auxiliary material 9 are formed.

The electrically conductive contact element 1 which results therefrom is shown in FIG. 1G, showing the caverns 7 filled with the auxiliary material 9 and arranged in a microstructure 11 in the contact surface 5.

In other embodiments, instead of a mechanical deformation, the auxiliary material 9 could also be enclosed in the microstructure 11 by administering a sealant onto the surface 5 of the intermediate step shown in FIG. 1E. A coating could be deposited onto the surface 5 in the intermediate step shown in FIG. 1E in order to seal the recesses 17 to enclose the auxiliary material 9 in the caverns 7.

Figure 2:
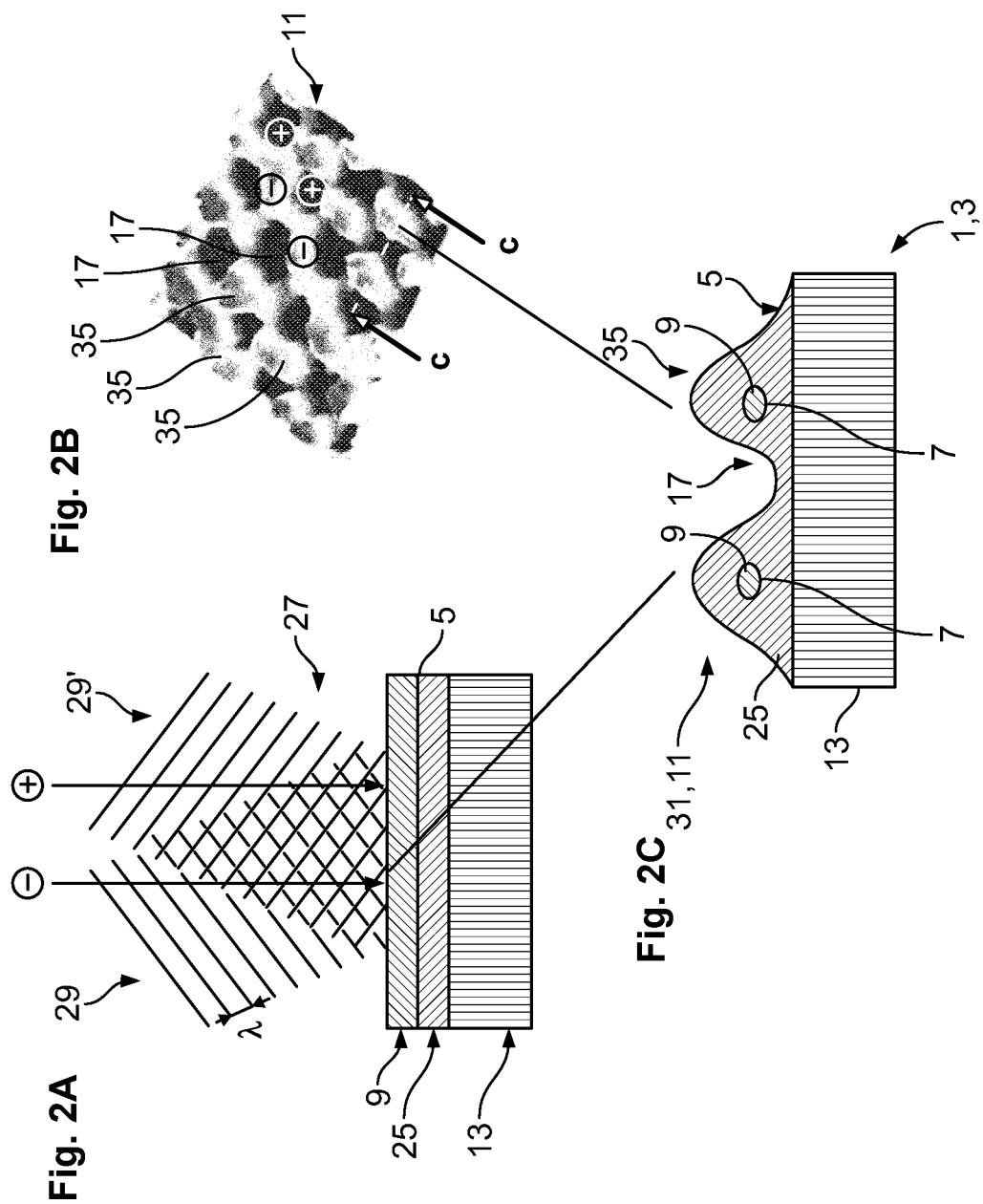
FIG. 2A is a schematic sectional side view of a contact surface having an auxiliary material deposited thereon.
FIG. 2B is a perspective view of a topography of a texture of the contact surface after laser irradiation.
FIG. 2C is a sectional side view of the contact surface with a microstructure taken along line C-C of FIG. 2B.

A method according to another embodiment for enclosing an auxiliary material 9 under the contact surface 5 of an electrically conductive contact element 1 for a connector 3 is shown in FIGS. 2A-2C.

The contact element 1 comprises a base material 13 that, as in the embodiment of FIGS. 1A-1G, can be copper or a copper alloy, for example. In contrast to the embodiment of FIGS. 1A-1G, a coating 25 is arranged on a surface of the base material 13 as shown in FIGS. 2A and 2C. The coating 25 can have, for example, tin, nickel, silver, or alloys of tin, nickel, silver and/or other elements. The coating 25 can be applied onto the base material 13 by hot-dip tinning, for example. A surface of the coating 25 facing away from the base material forms the contact surface 5.

The auxiliary material 9 is first applied onto the contact surface 5, as shown in FIG. 2A. The contact surface 5 can, for example, be completely coated with the auxiliary material 9. The auxiliary material 9 can be an antioxidant, a corrosion protection agent, a lubricant, or an acid. The auxiliary material 9 can have, for example, oil, grease, a paste, or a solid lubricant such as graphite, CNT, $MoS_2$, $AgS_2$ or a combination thereof.

After the auxiliary material 9 has been applied onto the contact surface 5, the microstructure 11, shown in FIGS. 2B and 2C, is subsequently formed. The auxiliary material 9 is enclosed in the microstructure 11 when forming the microstructure 11. The contact surface is treated with an interference pattern 27 by laser radiation 29, 29' as shown in FIG. 2A. In the case of such a laser interference texturing, two or more overlapping, coherently or linearly polarizing laser beams 29, 29' produce a systematically adjustable interference pattern 27. A prerequisite for this is the spatial and temporal coherence of the laser radiation 29, 29'. The spatial coherence can be compromised by interaction with the environment or the optical elements of the apparatus for creating the interference radiation. The temporal coherence depends on the spectral bandwidth λ of the laser radiation 29, 29'. Standard coherence lengths of the spectral bandwidth are in the range of 266 to 1064 nm.

By selecting the laser radiation 29, 29' and the quantity and the relative orientation of the laser radiation 29, 29', various interference patterns 27, for example, line patterns, dot patterns, honeycomb patterns, cross-shaped patterns, etc. can thus be created. The interference pattern 27 gives the microstructure 11 and the surface textures 31 of the contact surface 5 shown in FIG. 2C.

If the contact surface S is treated with an interference pattern 27 of laser radiation 29, 29', two or more overlapping, coherent and linearly polarizing laser beams 29, 29' produce a systematically adjustable interference pattern 27. The intensity of the laser radiation is distributed within the interference pattern 27. In the case of positive interference (+), it intensifies and leads to particularly hot areas at which the contact surface 5 melts. In contrast, in the case of negative interference (−) at the minimum intensity, the contact surface 5 is much colder, such that the contact surface 5 does not melt or rather auxiliary material 9 at this location is still present, whereas it is vaporized in regions of positive interference. Moreover, due to the high temperature gradients between minimal temperature (in the area of negative interference) and maximum temperature (in the area of positive interference), molten material of the contact surface 5 is convected and the texture 31 shown in FIG. 2C develops. The texture 31 develops in that material of the contact surface 5 is directed from areas of a maximum temperature to areas of a minimum temperature.

If the contact surface 5 of an electrically conductive contact element 1, onto which a layer of auxiliary material 9 has been applied, is irradiated with the interference pattern 27 of laser radiation 29, 29' shown in FIG. 2A, in the area of positive interference (+), the auxiliary material 9 is vaporized and volatilized and, in the area of negative interference (−), it remains on the contact surface 5. The material melts the contact surface 5 in areas of positive interference and spills, in a directed manner, into the areas of negative interference where, forming elevations 15, it covers the auxiliary material 9 which remains there. In this way, a contact surface 5, such as in FIGS. 2B and 2C, can be formed which has a burl structure, wherein every burl 35 has a cavity 7 filled with the auxiliary material 9.

In interference texturing, the auxiliary material 9 is thus enclosed in the microstructure 11 when forming the microstructure 11. At the same time, a texturing 31 of the contact surface 5 takes place. In the exemplary embodiment shown in FIG. 2C, the surface texture 31 is formed by a burl structure with regularly arranged burls 35 and recesses 17 in between. In the exemplary embodiment shown, the surface texture 31 is congruent with the microstructure 11 of the caverns 7 filled with auxiliary materials 9. In this case, the surface texture 31 is elevated above a cavern 7 of the microstructure 11. In the shown example, a cavern 7 filled with auxiliary materials 9 is arranged in every burl 35.

Figure 3:
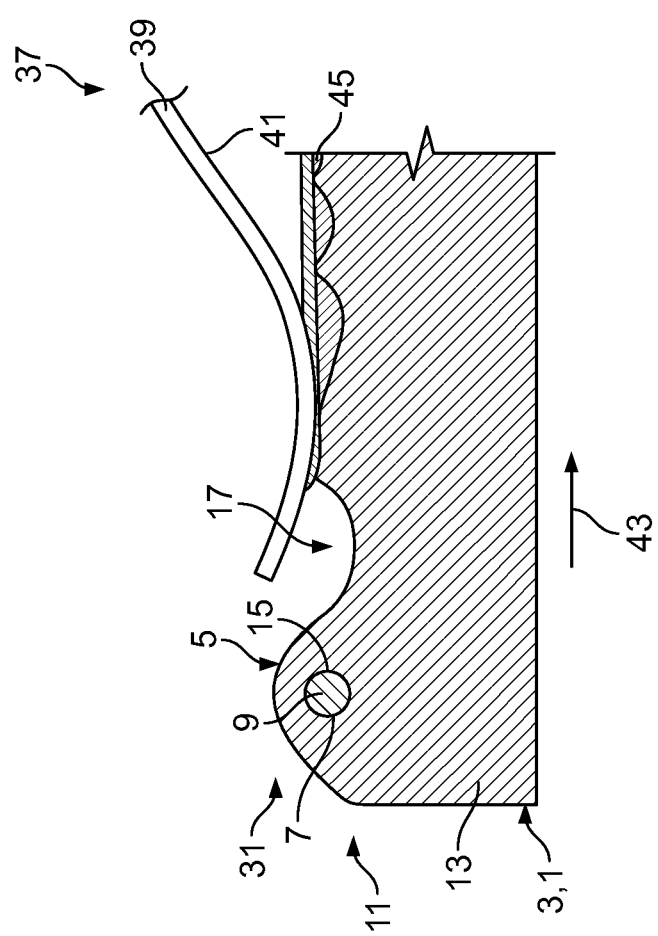
FIG. 3 is a sectional side view of a contact element of a connector plugged together with a mating contact element of a mating connector.

The contact element 1 of the connector 3 is shown plugged together with a mating connector 37 in FIG. 3. The contact element 1 is electrically conductive and consists of a base material 13, for example a copper or copper alloy. The contact element 1 has a contact surface 5. Caverns 7 filled with auxiliary material 9 are arranged under the contact surface 5 in a microstructure 11. The contact surface 5 in the shown embodiment has a surface texture 31 which consists of periodically alternating elevations 15 and recesses 17. A cavern 7, which is filled with auxiliary material 9, of the microstructure 11 is arranged in every elevation 15. The surface texture 31 and the microstructure 11 of the contact element 1 of FIG. 3 thus correspond substantially to those of FIG. 2, with the exception that the coating 25 has been omitted and the auxiliary material 9 has been administered directly onto the base material 13.

The mating connector 37 has a mating contact element 39 and is adapted to be plugged together with the connector 3. The mating contact element 39 has a mating contact surface 41 which, as shown in FIG. 3, comes into contact with the contact surface 5 of the contact element 1 when the connector 3 is plugged together with the mating connector 37. The mating contact element 39 is an elastically deformable contact spring.

When the connector 3 and the mating connector 37 are plugged together, as shown in FIG. 3, the mating contact element 39 touches the contact element 1 in order to produce an electrically conductive connection. While the connector 3 is plugged together with the mating connector 37, the contact element 1 moves along a relative plugging direction 43 relative to the mating contact element 39.

Due to the pressing force exerted by the contact surface 41 of the mating contact element 39 onto the contact surface 5 of the contact element 1, frictional forces act between contact surface 5 and the mating contact surface 41, which must be overcome while the connector 3 is being plugged together with the mating connector 37. In order to reduce these forces, the contact surface 5 is equipped with a surface texture 31; the surface texture 31 reduces the bearing surface between the contact surface 5 and the mating contact surface 41. Furthermore, the surface texture 31 and the microstructure 11 of the contact element 1 are partially broken open while being plugged together. Entrances to the closed caverns 7, which were previously under the contact surface 5, are created by the frictional forces. The caverns 7 open out onto the contact surface 5. The auxiliary material 9 can emerge from the cavern 7 and form a film 45 of auxiliary material 9 on the contact surface 5, which forms the desired positive effect, for example reducing friction and/or corrosion protection.

In the contact element 1 produced according to any of the methods described herein, the auxiliary materials 9 are firmly embedded in the contact element 1, as they are filled into the caverns 7 under the contact surface 5. This prevents the auxiliary materials 9 from being subjected to negative effects, e.g. resinification. An undesired loss of the auxiliary materials 9 is preventing by firmly embedding them. As well as liquid auxiliary materials 9, solid auxiliary materials 9 can also be enclosed in the microstructure of the caverns in this way.

What is claimed is:

1. An electrically conductive contact element for an electrical connector, comprising:
   a contact surface having a plurality of caverns arranged under the contact surface in a microstructure; and
   an auxiliary material closed within the plurality of caverns by the contact surface arranged directly over each of the plurality of caverns.

2. The electrically conductive contact element of claim 1, wherein the microstructure extends parallel to the contact surface.

3. The electrically conductive contact element of claim 1, wherein the caverns form a substantially homogeneous pattern with the microstructure.

4. The electrically conductive contact element of claim 1, wherein the auxiliary material is selected from the group of an antioxidant, a corrosion protection agent, a lubricant, and an acid.

5. The electrically conductive contact element of claim 1, wherein the entirety of the auxiliary material is closed under the contact surface.

6. The electrically conductive contact element of claim 1, wherein the microstructure and the plurality of caverns are formed in a first material, wherein the auxiliary material is closed within the first material.

7. The electrically conductive contact element of claim 1, wherein the microstructure is formed within a coating applied to a base material of the contact element, wherein the plurality of caverns do not extend into the base material.

8. The electrically conductive contact element of claim 1, wherein the caverns do not have an output at the contract surface such that the auxiliary material cannot be accessed through the contact surface.

9. The electrically conductive contact element of claim 1, wherein the microstructure forms a pattern that is periodic at least in sections.

10. The electrically conductive contact element of claim 9, wherein the microstructure has a period length of 0.5 µm to 300 µm in at least one direction.

11. The electrically conductive contact element of claim 10, wherein the period length is 1 µm to 100 µm in at least one direction.

12. The electrically conductive contact element of claim 1, wherein the contact surface has a surface texture configured to reduce the bearing surface between the contact surface and a mating contact surface.

13. The electrically conductive contact element of claim 12, wherein the surface texture is congruent with the microstructure.

14. The electrically conductive contact element of claim 12, wherein the surface texture is formed on the contact surface directly above the caverns of the microstructure.

15. An electrical connector, comprising:
an electrically conductive contact element including a contact surface having a plurality of caverns arranged directly under the contact surface in a microstructure and an auxiliary material closed within each of the plurality of caverns by the contact surface arranged directly over each of the plurality of caverns.

16. A method for enclosing an auxiliary material under a contact surface of an electrically conductive contact element, comprising:
forming a microstructure at the contact surface;
applying the auxiliary material onto the contact surface; and
closing the auxiliary material within each of a plurality of caverns formed in the microstructure by forming the contact surface directly above each of the plurality of caverns.

17. The method of claim 16, wherein the enclosing step includes treating the contact surface with a laser radiation having an interference pattern.

18. The method of claim 16, wherein the applying step occurs before the forming step.

19. The method of claim 18, wherein the auxiliary material is enclosed in the microstructure during the forming step.

20. The method of claim 16, wherein the applying step occurs after the forming step.

21. The method of claim 20, wherein the enclosing step occurs after the applying step, and wherein the contact surface is mechanically deformed during the enclosing step.

* * * * *